Dec. 6, 1949  R. N. SHIRAS  2,490,283
ADDITION OF CARBON MONOXIDE-HYDROGEN
TO UNSATURATED COMPOUNDS
Filed Feb. 3, 1947
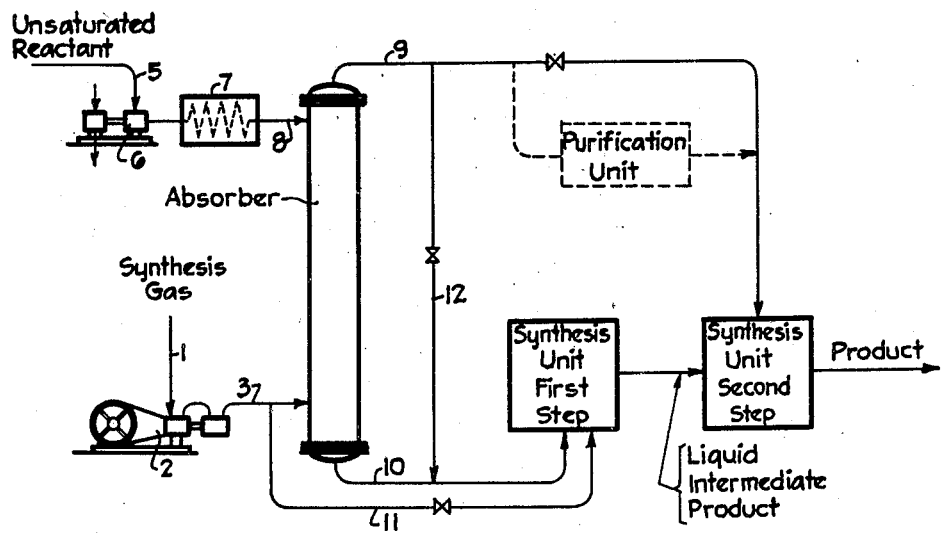
Fig. I
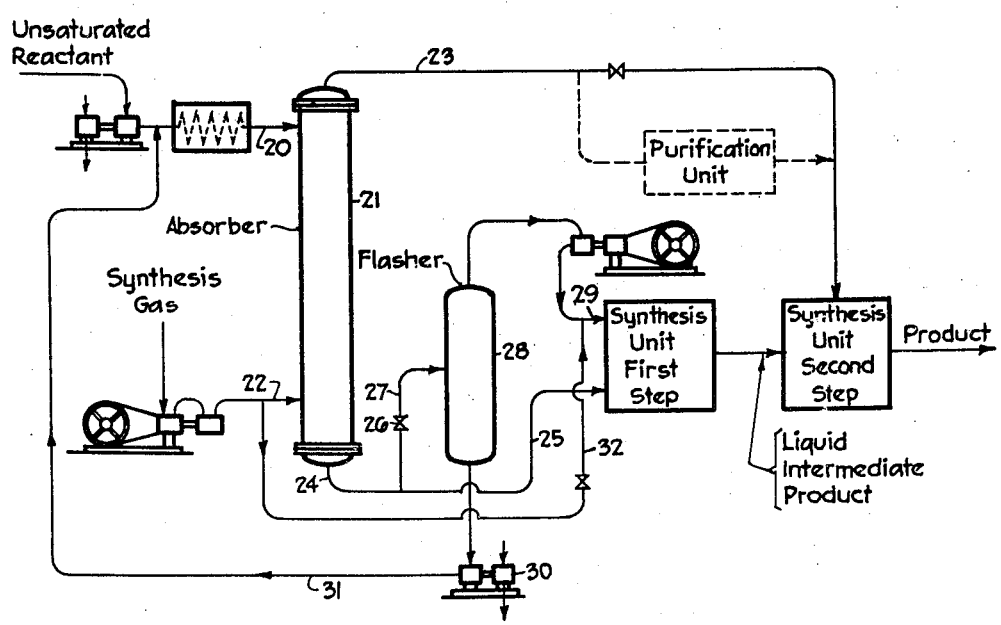
Fig. II
Inventor: Russell N. Shiras
By his Attorney:

Patented Dec. 6, 1949

2,490,283

UNITED STATES PATENT OFFICE 2,490,283

ADDITION OF CARBONMONOXIDE-HYDROGEN TO UNSATURATED COMPOUNDS

Russell N. Shiras, Oakland, Calif., assignor to Shell Development Company, San Francisco, Calif., a corporation of Delaware Application February 3, 1947, Serial No. 726,085

9 Claims. (Cl. 260—632)

This invention relates to an improvement in processes for the synthesis of various oxygenated compounds by the catalytic addition of carbon monoxide and hydrogen to unsaturated bonds of various organic reactants. The invention relates in one more specific embodiment to the production of carbinols. A still more specific embodiment relates to the production of primary alcohols by the addition of carbon monoxide and hydrogen to olefins.

It is known that by the application of suitable conditions and catalysts carbon monoxide and hydrogen may be caused to react with a variety of organic compounds (U. S. 1,698,602, U. S. 1,743,214, U. S. 1,746,781, U. S. 1,889,251, U. S. 1,900,829, U. S. 1,973,662, U. S. 2,327,066, U. S. 2,402,133) to produce oxygenated products containing an increased number of carbon atoms. The reaction appears to be general for unsaturated hydrocarbons and unsaturated oxygen derivatives thereof. (Unsaturated, as the term is herein used, is meant to indicate the presence of an ethylenic bond or acetylenic bond.) (Petroleum Refiner 25:503–504 (1946).) It is applicable with unsaturated organic compounds containing nitrogen, phosphorus, sulfur, halogen, arsenic. Unsaturated compounds containing other elements have not been sufficiently investigated to determine the extent of their applicability. However, it appears that at least those of the more electro-positive elements such as the alkali metals and alkaline earth metals are applicable when in ester or salt form.

The reaction takes place readily at an ethylenic bond. When one molecule each of carbon monoxide and hydrogen are added, the product contains the aldehyde group. Thus the addition reaction for an ethylenic bond is

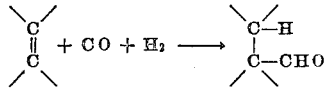

When one molecule of carbon monoxide and two molecules of hydrogen are added, the product contains the carbinol group. Thus the addition reaction for an ethylenic bond is:

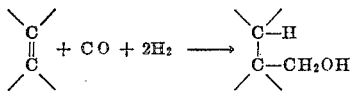

When steam is present in the reaction zone, some carboxylic acids are produced.

While these reactions can be fairly well controlled, they occur at least to some extent simultaneously. Also, some secondary reactions usually take place with the formation of ketones, aldol condensation products, and esters as well as some polymerization products of the unsaturated reactants. By far the most damaging side reaction is, however, the hydrogenation of appreciable portions of the unsaturated reactant prior to the desired addition of carbon monoxide. The addition reaction is catalyzed by metal carbonyls. The various metal carbonyls are in equilibrium or tend to be in equilibrium with metal and the carbon monoxide under the reaction conditions so that there is at least some highly active metal in the reaction zone. This metal, which also exerts a beneficial catalytic effect, tends to catalyze the hydrogenation of the unsaturated reactant, and, since under the conditions necessary for the carbon monoxide-hydrogen addition this hydrogenation reaction takes place at an appreciable rate, a substantial amount of the reactant is simply hydrogenated to the corresponding saturated compound. This is not only undesirable as representing an appreciable waste of hydrogen and valuable reactants, but also since it results in a less pure product.

In order to minimize the above-mentioned undesired hydrogenation reaction it is the practice to carry out the process in two or more stages and to use a carbon monoxide-hydrogen gas mixture (synthesis gas) relatively concentrated in carbon monoxide and lean in hydrogen in the first stage. The preferred synthesis gas is one containing a ratio of hydrogen to carbon monoxide below about 1.5 to 1. A synthesis gas rich in hydrogen is then used in the last stage. As will be appreciated, this requires production of two synthesis gases of different compositions, or adjustment of the concentrations of separate portions of synthesis gas. By far the most practical method hitherto known and the method hitherto employed to provide the desired synthesis gases is to produce a synthesis gas containing a ratio of hydrogen to carbon monoxide greater than 1.5 (as by the partial combustion of natural gas) to separate part of the gas into its components through the agency of copper ammonium formate, and then to reblend the separated components with the remainder of the synthesis gas to produce two syntheses gases of different and desired compositions suitable for the two stages of the process. While this method is workable, it is involved and the process is of doubtful economy except in the production of a few oxygenated products which may be produced from relatively inexpensive raw materials and command a relatively high price.

It has now been found that the above-described process for the production of oxygenated products by addition of carbon monoxide and hydrogen may be more advantageously carried out in the manner hereinafter described wherein the unsaturated reactant is utilized for adjusting the compositions of the synthesis gas and is applied to the first and last stages of the process.

To describe and illustrate the invention, reference will be had to the attached drawings wherein two process flows are illustrated diagrammatically.

Referring to the drawing, Figure I, a synthesis gas containing hydrogen and carbon monoxide in a mol ratio above 1.5 to 1, and preferably about 2:1, is introduced via line 1. This gas is compressed by compressor 2 to a suitable high pressure and then passed via line 3 to an absorption zone 4 wherein it is intimately contacted under absorption conditions with the liquid unsaturated reactant feed to the process. The pressure is between about 1500 and 4500 pounds per square inch and preferably approximately that used in the first step of the synthesis, for instance 2500 p. s. i. g. as compared to 2000 p. s. i. g. The temperature may be ordinary or normal temperature, for instance 27° C., but is preferably held below normal by suitable refrigeration. The maximum degree of refrigeration is limited only by the freezing point of the liquid. Preferred temperatures are between about 0° C. and about −20° C.

The unsaturated reactant is introduced via line 5. After being brought up to the desired pressure by pump 6 it is passed to a cooler 7 wherein it is cooled to the desired temperature. The cooled liquid is then introduced near the top of absorber 4 via line 8. This material may be any of the various unsaturated compounds, liquid under these conditions, applicable as reactants in the production of oxygenated compounds by the catalyzed addition of synthesis gas.

The amounts of synthesis gas and unsaturated reactant supplied to the absorption zone are preferably substantially the amount required for the subsequent synthesis, taking into account the extent of the reaction, the formation of side reaction products and the desirability of bleeding a small amount of gas from the synthesis system to prevent excessive accumulation of diluent gas.

The absorber 4 may be of any efficient conventional type such as a suitably packed tower or an absorber equipped with plates and bubble caps. Due to the unsaturated character of the reactant feed supplied to the absorber and the countercurrent method of contact, most of the carbon monoxide and part of the hydrogen are absorbed leaving a gas lean in carbon monoxide which is withdrawn via line 9. When an absorber of good efficiency is used, the lean gas contains 5% or less of carbon monoxide. However, a lean gas containing somewhat more carbon monoxide, for instance up to 10%, is suitable in many cases and is more easily obtained.

The liquid product from the absorber is passed via line 10 to the first synthesis step. The lean gas is passed via line 9 to the second synthesis step.

If desired the conditions in absorber 4 may be adjusted to give synthesis gases of the desired compositions within the applicable ranges. However, control through adjustment of the conditions in the absorber is not necessary. Thus, the adjustment may be more easily accomplished by by-passing a portion of the original synthesis gas via line 11 and/or reblending a portion of the lean gas via line 12 to the feed to the first synthesis step. Thus, for example, if it is desired that the lean gas contain less than 5% carbon monoxide with a given absorber under a given set of conditions, the synthesis gas feed to the absorber is adjusted to give this result and the remaining synthesis gas is by-passed via line 11. If on the other hand, a synthesis gas of somewhat higher ratio of hydrogen to carbon monoxide is desired in the first synthesis step, some of the lean gas rich in hydrogen is passed to the first synthesis step via line 12.

As an example of operation according to the described process, the production of butyl alcohol may be cited. The unsaturated reactant is a refinery $C_3$ fraction containing 35 mol per cent propylene. The synthesis gas is produced by the partial combustion of methane with oxygen at about 1150° C. and consists of hydrogen and carbon monoxide in a mol ratio of about 2:1 along with small amounts of impurities. The desired feed to the first step of the synthesis contains hydrogen, carbon monoxide and propylene in the mole ratio below 1.5:1:1 and preferably about 1.4:1:1. The propane-propylene fraction is cooled sufficiently to maintain the temperature in the absorber at about −18° C. The absorber is a plate absorber having the equivalent of 16 theoretical plates. The pressure in the absorber is maintained at about 3000 p. s. i. g. The first synthesis step is effected at a pressure of about 2700 p. s. i. g. and the second synthesis step is effected at a pressure of about 2500 p. s. i. g. A total of about 3.052 moles of synthesis gas per mole of propylene is fed to the system. Of this about 45% is fed to the absorber and the remainder is by-passed via line 11. The liquid product from the absorber has the following approximate composition (mole basis):

| | |
|---|---:|
| Hydrogen | 1.438 |
| Carbon monoxide | 1.000 |
| Propylene | 1.000 |
| Propane | 1.857 |
| | 5.285 |

This product contains the desired reactants, is very close to the desired concentrations, and is fed to the first synthesis step. The lean gas is passed directly to the second synthesis step.

In some cases, and particularly when reacting carbon monoxide and hydrogen with olefins of high molecular weight, it is more advantageous to operate the process in the manner illustrated in Figure II. In this modification the liquid unsaturated reactant is recycled in part through the absorber and a low pressure flasher. In this modification greater concentrations of carbon monoxide may be obtained with less cooling.

Referring to the drawing, Figure II, the unsaturated reactant is introduced via line 20 near the top of the absorber 21. Synthesis gas, for instance obtained by the partial combustion of methane and containing hydrogen and carbon monoxide in a ratio of about 2:1, is introduced near the bottom of the absorber via line 22. A high pressure, such as 3000 p. s. i. g., is maintained in the absorber. The temperature in the absorber is room temperature or lower, for instance 5° C. or below. The desired temperature is obtained, as before, by cooling the liquid reactant. The lean gas from the top of the absorber is passed via line 23 to the second step of the synthesis process. If necessary or desired, this gas may be subjected to a conventional treatment to remove small amounts of carbon monoxide. The fat liquid is withdrawn from the bottom of the absorber via line 24. This stream is divided into two streams. One stream is passed, as before, directly to the first step of the synthesis via line 25. The remainder is passed via line 27 through a pressure reduction valve 26 to a low pressure flasher 28. The pressure in flasher 28 is materially lower than in the absorber and may be, for example, substantially atmospheric pressure. Gas released from the reactant in the low pressure absorber is compressed and passed via line 29 to the first synthesis step. The liquid is continuously withdrawn from the bottom of the low pressure flasher and returned to the absorber via pump 30 and lines 31 and 20. As before, a portion of the 2:1 synthesis gas may be by-passed via line 32 and commingled with the gas fed to the first synthesis step.

A typical application of this modification of the invention is in the production of nonyl alcohol from 2:1 synthesis gas and diisobutylene. For the first synthesis step one mol of carbon monoxide per mol of diisobutylene is used, and a synthesis gas having a ratio of hydrogen to carbon monoxide below 1.5:1 and preferably about 1.4:1 is desired. The absorber is again a plate absorber having the equivalent of 16 theoretical plates. The pressure in the absorber is maintained at about 2500 p. s. i. g. The temperature is maintained at about —18° C. by cooling the liquid feed to the absorber. A total of about 3.048 mols of synthesis gas (2:1) per mol of diisobutylene is supplied to the system. Of this about 1.41 mols is passed to the absorber and the remainder is by-passed via line 32. The fat liquid from the absorber has the following approximate composition (mol basis):

| | |
|---|---|
| Hydrogen | 0.303 |
| Carbon monoxide | 0.460 |
| Diisobutylene | 5.735 |
| | 6.548 |

Of this, about 75% is passed to the low pressure flasher operated at atmospheric pressure. Thus, about 4.785 mols of diisobutylene per mol of fresh diisobutylene feed is passed through the low pressure flasher and cycled to the absorber. The gas released is compressed and passed to the first synthesis step along with the remaining approximately 25% of the fat liquid. This gives the desired feed to the first synthesis step. The ratio of carbon monoxide to hydrogen in the feed can be altered appreciably and controlled by variation and control of the proportion of the diisobutylene recycled.

The invention claimed is:

1. In a process for the production of an oxygenated compound by the catalyzed addition of carbon monoxide and hydrogen to an unsaturated reactant in two synthesis steps using a synthesis gas rich in carbon monoxide in the first step and a synthesis gas lean in carbon monoxide in the second step, the improvement which comprises supplying to the process a synthesis gas containing hydrogen and carbon monoxide in a mol ratio above 1.5:1, contacting said synthesis gas with the liquid unsaturated reactant under absorption conditions in an absorption zone, passing the liquid containing dissolved hydrogen and carbon monoxide from said absorption zone to the first synthesis step and therein producing a liquid intermediate synthesis product, passing said liquid intermediate synthesis product to the second synthesis step, and passing the lean gas from said absorption zone to the second synthesis step.

2. Process according to claim 1 in which the absorption zone is maintained under a pressure slightly higher than that prevailing in the reaction zone of the first synthesis step.

3. Process according to claim 1 in which the absorption zone is maintained under a pressure between about 1500 and 4000 p. s. i. g.

4. Process according to claim 1 in which the absorption zone is maintained below normal temperatures by cooling the unsaturated reactant fed thereto.

5. Process according to claim 1 in which sufficient synthesis gas is by-passed around the absorption zone to the first synthesis step so that the total amount of synthesis gas fed to the first synthesis step is from 1 to about 1.5 moles per mole of unsaturated reactant fed, including that dissolved in the liquid.

6. Process according to claim 1 in which a portion of the liquid effluent from the absorption zone is passed to a flashing zone maintained at a substantially reduced pressure to release dissolved gas and then recycled from said flashing zone to the absorption zone, and the gas released in said flashing zone is recompressed and passed to the first synthesis step.

7. Process according to claim 1 in which the unsaturated reactant is an olefin.

8. Process according to claim 1 in which the unsaturated reactant fed to the absorption zone is an olefinic petroleum fraction.

9. Process according to claim 1 in which the synthesis gas supplied to the process contains hydrogen and carbon monoxide in a mole ratio of about 2:1.

RUSSELL N. SHIRAS.

REFERENCES CITED

The following references are of record in the file of this patent:

UNITED STATES PATENTS

| Number | Name | Date |
|---|---|---|
| 2,327,066 | Roelen | Aug. 17, 1943 |
| 2,402,133 | Gresham et al. | June 18, 1946 |